US010348818B1

(12) United States Patent
Bridges et al.

(10) Patent No.: US 10,348,818 B1
(45) Date of Patent: Jul. 9, 2019

(54) PROXIMITY-BASED PEER-TO-PEER COLLABORATIVE PLAYLISTS

(71) Applicant: Accenture Global Solutions Limited, Dublin (IE)

(72) Inventors: Matt Bridges, Natick, MA (US); Logan Wright, Somerville, MA (US); Mark Daigneault, Quincy, MA (US); Guilherme Fernandes Schmitt, Porto Alegre (BR)

(73) Assignee: Accenture Global Solutions Limited, Dublin (IE)

( * ) Notice: Subject to any disclaimer, the term of this patent is extended or adjusted under 35 U.S.C. 154(b) by 282 days.

(21) Appl. No.: 15/416,802

(22) Filed: Jan. 26, 2017

Related U.S. Application Data

(60) Provisional application No. 62/287,815, filed on Jan. 27, 2016.

(51) Int. Cl.
G06F 15/16 (2006.01)
H04L 29/08 (2006.01)
H04W 8/00 (2009.01)
H04W 4/80 (2018.01)
H04W 80/04 (2009.01)

(52) U.S. Cl.
CPC ............. H04L 67/104 (2013.01); H04W 4/80 (2018.02); H04W 8/005 (2013.01); H04W 80/04 (2013.01)

(58) Field of Classification Search
CPC ............... H04L 65/403; H04L 65/1089; H04L 65/4015
USPC ........................................................ 709/219
See application file for complete search history.

(56) References Cited

U.S. PATENT DOCUMENTS

| 8,495,246 | B2 * | 7/2013 | Heller | G11B 27/002 |
| | | | | 386/248 |
| 8,655,266 | B2 * | 2/2014 | Shaffer | H04H 20/57 |
| | | | | 455/3.06 |
| 9,002,879 | B2 * | 4/2015 | Spiegelman | G06F 17/30766 |
| | | | | 707/769 |
| 9,241,355 | B2 * | 1/2016 | Schulert | H04N 21/41407 |
| 9,361,371 | B2 * | 6/2016 | Coburn, IV | G06F 17/30772 |
| 9,436,929 | B2 * | 9/2016 | Oliver | G06Q 10/10 |
| 9,495,076 | B2 * | 11/2016 | Kumar | H04L 12/6418 |
| 9,516,370 | B1 * | 12/2016 | Weel | G06Q 30/06 |
| 9,552,418 | B2 * | 1/2017 | Reznor | H04M 1/72522 |
| 9,563,703 | B2 * | 2/2017 | Nijim | G06F 17/30828 |
| 9,635,131 | B2 * | 4/2017 | Roberts, Jr. | H04L 67/306 |
| 9,654,891 | B2 * | 5/2017 | Murrells | H04R 29/004 |
| 9,665,657 | B2 * | 5/2017 | Lewis | G06F 17/3089 |
| 9,712,859 | B2 * | 7/2017 | Gavade | H04N 21/26258 |
| 9,769,863 | B2 * | 9/2017 | Jamal-Syed | H04W 76/14 |
| 10,028,005 | B2 * | 7/2018 | Archibong | H04L 65/4084 |
| 10,097,632 | B2 * | 10/2018 | Brown | H04L 67/1095 |

(Continued)

Primary Examiner — Melvin H Pollack
(74) Attorney, Agent, or Firm — Harrity & Harrity, LLP

(57) ABSTRACT

Proximity-based peer-to-peer collaborative playlists over wireless networks are provided. In some embodiments, a first mobile device sends a name for a media playlist to a server. The first mobile device receives from the server a media playlist identifier corresponding to the media playlist. The first mobile device sends a wireless advertisement for the media playlist. The wireless advertisement comprises the media playlist identifier. The first mobile device receives at least one media playlist modification request from a second mobile device. The at least one media playlist modification request is received via the server.

23 Claims, 6 Drawing Sheets

(56) References Cited

U.S. PATENT DOCUMENTS

| | | | | |
|---|---|---|---|---|
| 2011/0314388 A1* | 12/2011 | Wheatley | ............. | G11B 27/034 |
| | | | | 715/751 |
| 2012/0117026 A1* | 5/2012 | Cassidy | ............ | G06F 17/30053 |
| | | | | 707/634 |
| 2013/0013740 A1* | 1/2013 | Liu | .................... | H04L 61/1594 |
| | | | | 709/219 |
| 2013/0124664 A1* | 5/2013 | Fonseca, Jr. | .......... | H04L 67/125 |
| | | | | 709/208 |
| 2013/0166649 A1* | 6/2013 | Atzmon | ................. | H04L 67/22 |
| | | | | 709/204 |
| 2016/0328396 A1* | 11/2016 | Rajapakse | ............... | H04L 65/80 |
| 2017/0093943 A1* | 3/2017 | Alsina | .................... | H04L 65/60 |

\* cited by examiner

PROXIMITY-BASED PEER-TO-PEER COLLABORATIVE PLAYLISTS

BACKGROUND

Embodiments of the present invention relate to collaborative management of media playlists, and more specifically, to proximity-based peer-to-peer collaborative playlists over wireless networks.

BRIEF SUMMARY

According to some embodiments of the present invention, a method of and computer program product for proximity-based peer-to-peer collaborative playlists are provided. A first mobile device sends a name for a media playlist to a server. The first mobile device receives from the server a media playlist identifier corresponding to the media playlist. The first mobile device sends a wireless advertisement for the media playlist. The wireless advertisement comprises the media playlist identifier. The first mobile device receives at least one media playlist modification request from a second mobile device. The at least one media playlist modification request is received via the server.

According to other embodiment of the present invention, a method of and computer program product for proximity-based peer-to-peer collaborative playlists are provided. A second mobile device receives a wireless advertisement originating from a first mobile device. The wireless advertisement comprising a media playlist identifier. The second mobile device sends to a server a request for a name for a media playlist corresponding to the media playlist identifier. The seconds mobile device sends at least one media playlist modification request to the first mobile device via the server.

DETAILED DESCRIPTION

Figure 1:
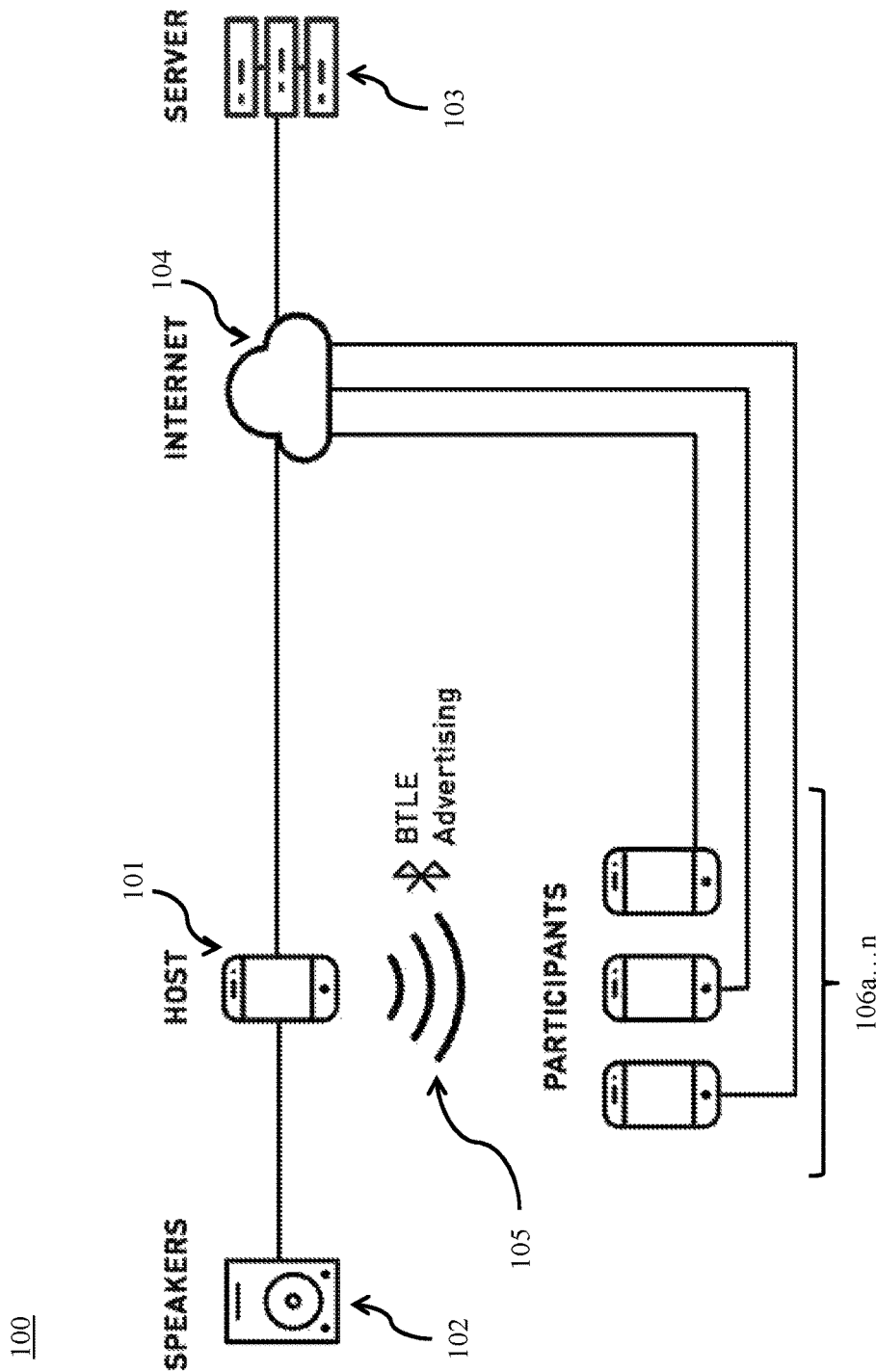
FIG. 1 depicts a system for proximity-based peer-to-peer collaborative playlists according to embodiments of the present disclosure.

When people listen to music together, music selection is a crucial aspect of a group's collective experience. Music selection paradigms range from the informal (e.g., spoken requests to a DJ) to formalized or technology-based (e.g., jukeboxes in a public setting). As music consumption has trended toward digital, there has emerged a need for new music selection models. For example, collaborative playlists allow members of a group to collectively manage music selection. With the ubiquity of data networks, groups can leverage mobile devices, music streaming, and cloud-based playlist management services.

Forming a collaborative playlist on a digital platform with a group of people may be difficult to set up. Discovery, formation, and joining processes for individuals that are based on authenticated accounts, passwords, QR codes, link sharing, presence on a physical LAN, or a combination thereof may be inefficient and unreliable. Accordingly, embodiments of the present disclosure provide efficient and reliable systems and methods for creating, discovering, and joining ad-hoc networks of mobile devices by leveraging short range wireless communication.

Various exemplary embodiments provided herein are described in terms of Bluetooth and Bluetooth Low Energy. In particular, several exemplary embodiments are described in terms of Bluetooth Low Energy advertisements in combination with a cloud-based WAN infrastructure. However, it will be apparent to one of skill in the art that the systems and methods of the present disclosure are applicable to various other personal area networks (PAN) and wireless communication protocols such as those defined in the various IEEE 802.11 specifications. Exemplary PANs include INSTEON, IrDA, Wireless USB, Bluetooth, Z-Wave, ZigBee, and Body Area Network.

Wireless service advertisements such as those defined in the Bluetooth specification are relatively short range. In addition, while a personal area network or a short range strobe may be suitable for device discovery or for service advertisement, it may be too limited in range, bandwidth, or power characteristics to support ongoing communication within a group. Accordingly, in various embodiments of the present disclosure, Bluetooth advertisements are used to detect proximity, while a longer range wireless connection is used for ongoing communications, which may be routed over the Internet.

Accordingly, in some embodiments, proximity to a host device is used as a prerequisite to joining a group. Proximity may be assessed using limited range Bluetooth advertisements from mobile devices. In some embodiments, identifying information is passed along in advertisements to eliminate the need for credential sharing or authentication, resulting in an experience where discovery and joining is mostly invisible to users of the system. In addition, once the process of joining is complete, various embodiments leverage the Internet to facilitate communication between the members of the newly formed group of collaborators. This results in extremely robust peer-to-peer communication that is not reliant on Bluetooth once the group is formed.

With reference now to FIG. 1, an exemplary system according to the present disclosure is depicted. Host 101 is the initiator of a collaborative playlist. In some embodiments, host 101, is a mobile device such as a smartphone, tablet, or laptop. In other embodiments, host 101 is a desktop computer or other non-mobile device. Host 101 is operatively coupled to a media output device 102, which in some embodiments is a speaker. However, it will be apparent that the systems and methods of the present disclosure are applicable to additional media such as video using output devices such as digital displays. The connection between host 101 and media output device 102 may be wired or wireless. For example, in some embodiments a wired connection is provided through a stereo mini plug connector, while in some embodiments a wireless connection is provided through Bluetooth.

Host 101 is in communication with server 103 via network 104. In some embodiments, network 104 is the internet. Server 103, as set forth below, communicates with host 101 and any participants to create and maintain playlists. In some embodiments, the functionality of server 103 is integrated into host 101. In such embodiments, any participants communicate with host 101 directly view network 104.

Host 101 sends local wireless signals 105. In some embodiments, local signals 105 are Bluetooth low energy (BTLE or BLE) advertisements. As set forth further below, one or more participants 106a ... n receive signals 105 and subsequently communicate with server 103 to participate in collaborative playlists.

Figure 2:
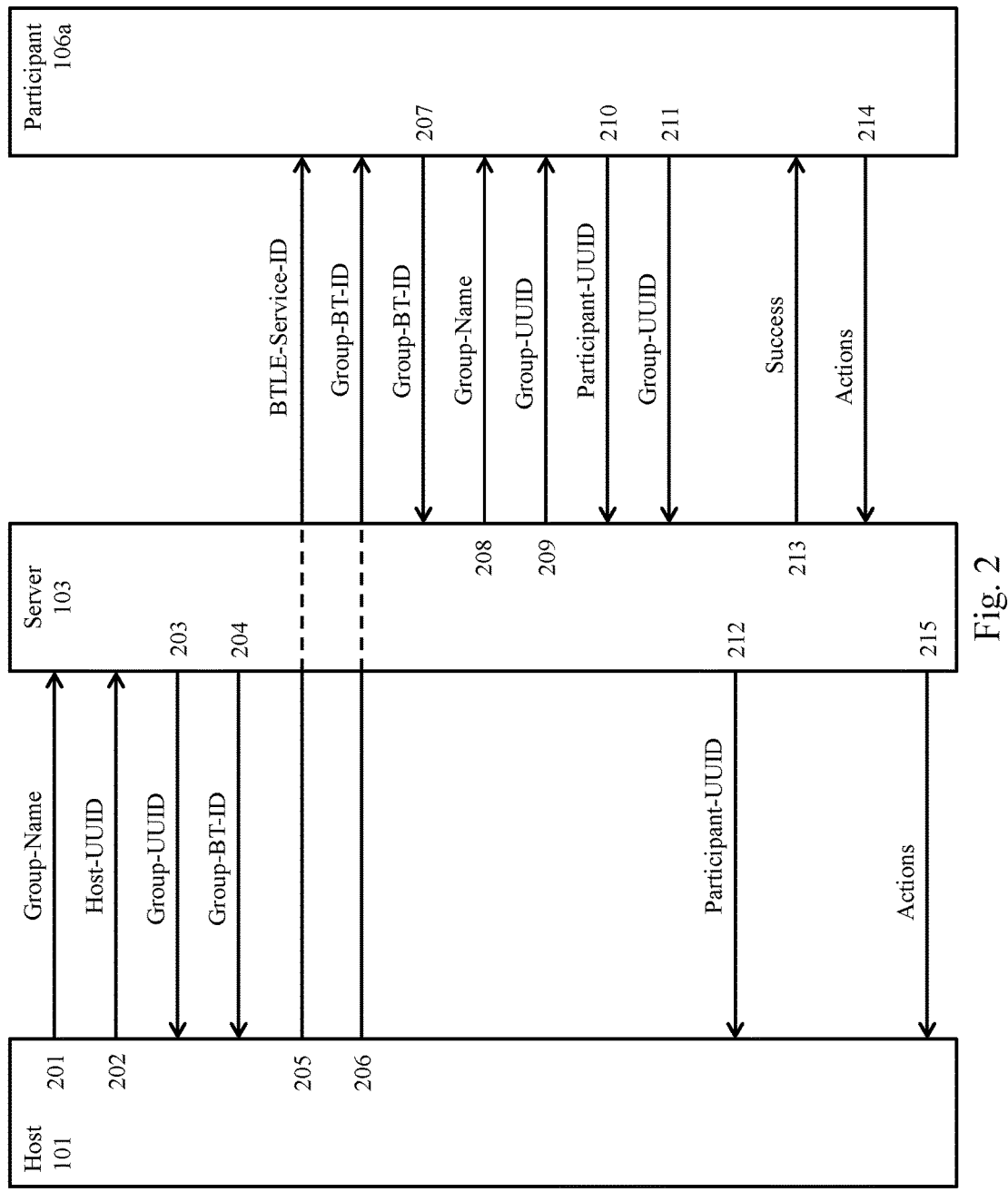
FIG. 2 illustrates a method for proximity-based peer-to-peer collaborative playlists according to embodiments of the present disclosure.

With reference to FIG. 2, in an exemplary method using system 100 is illustrated. A single mobile device, Host 101, initiates the creation of a collaborative playlist (which may be referred to as a Group), providing a name (Group-Name). In some embodiments, Group-Name is a string. As noted above, Host 101 is connected to a media output device 102 (e.g., a speaker or PA system). Host 101 contacts an Internet-connected server 103, providing the name of the Group 201 and a universally unique identifier (UUID) for the Host device 202 (Host-UUID). The Server stores the name and generates a UUID for the new group (Group-UUID).

Server 103 generates identifying information suitable for advertisements, for example via Bluetooth. In some embodiments, the identifying information comprises two 32-bit integers (Group-BT-ID). Group-BT-ID is unique to all active Groups known by Server. The Server responds to the Host, providing Group-UUID 203 and Group-BT-ID 204.

The Host begins to advertise the presence of the Group. In some embodiments, advertisement is performed using Bluetooth Low Energy advertisements. The advertisements contain both a standard BTLE Service ID 205 (BTLE-Service-ID, representing the collaborative playlist service) and the Group-BT-ID 206 (representing the specific Group that is available). Nearby devices of potential new Group members (Participant 106a) listen for advertisements containing BTLE-Service-ID. It will be appreciated that in some embodiments that do not use Bluetooth, an alternative service ID may be suitable. For example, a message preamble may be included in radio beacon.

When a Participant 106a receives an advertisement containing BTLE-Service-ID, it reads and stores the associated Group-BT-ID contained in the advertisement. The Participant device contacts the Server 207 and asks for the Group-Name 208 and Group-UUID 209 of the Group associated with Group-BT-ID 207. The Participant device displays Group-Name to the user of the device, allowing them to take action and join the Group. When the Participant user takes action, the device contacts the Server, providing a UUID for the Participant device 210 (Participant-UUID) and the Group it wishes to join 211 (Group-UUID).

The Server contacts Host to let it know that Participant-UUID has joined 212. The Server responds to Participant with a success response 213 and the current state of the collaborative playlist. Participant has now successfully joined and can issue requests to modify the collaborative playlist to the Server 214 (Actions). The Server passes playlist modification requests 215 to Host, which carries out the desired Action.

Figure 3:
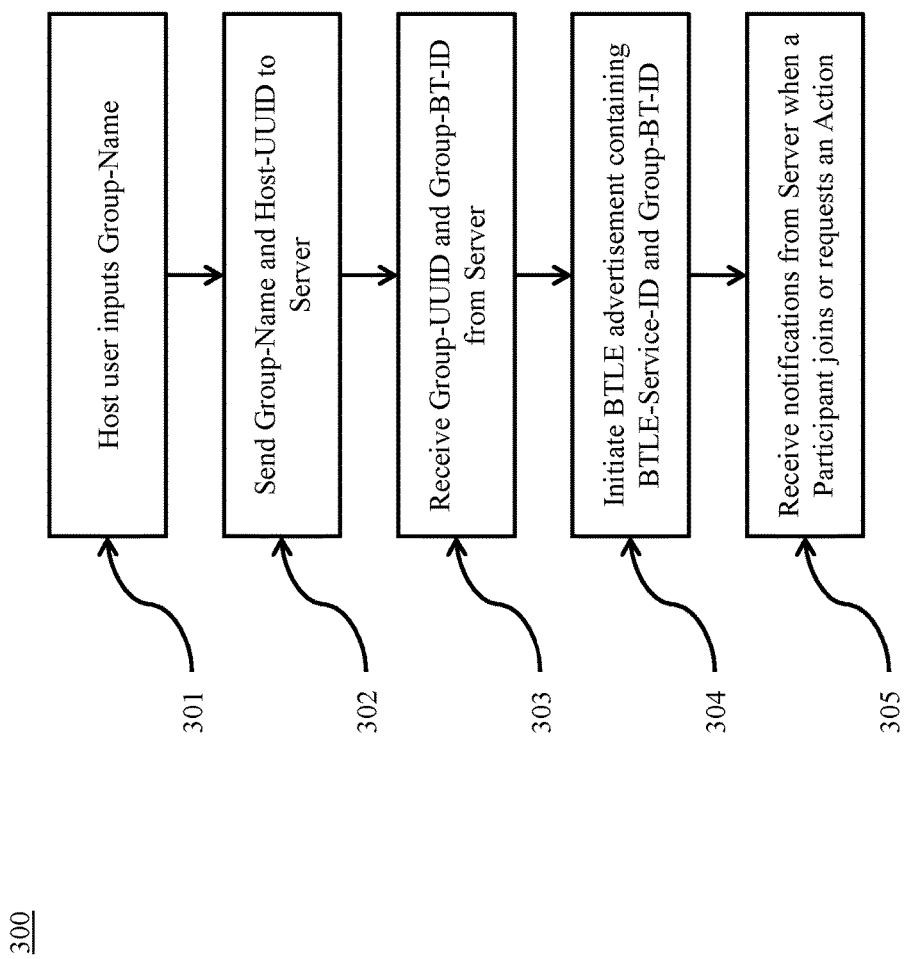
FIG. 3 illustrates a method for proximity-based peer-to-peer collaborative playlists according to embodiments of the present disclosure.

Referring now to FIG. 3, an exemplary method for a host according to the present disclosure is illustrated. A host user inputs 301 a Group-Name to the host via a user interface device. The hosts sends 302 the Group-Name and Host-UUID to a Server. The host receives 303 the Group-UUID and Group-BT-ID from the Server. The host initiates 304 advertisement, for example via Bluetooth low energy, containing BTLE-Service-ID and Group-BT-ID. The host receives 305 notifications from Server when a Participant joins or requests an Action.

Figure 4:
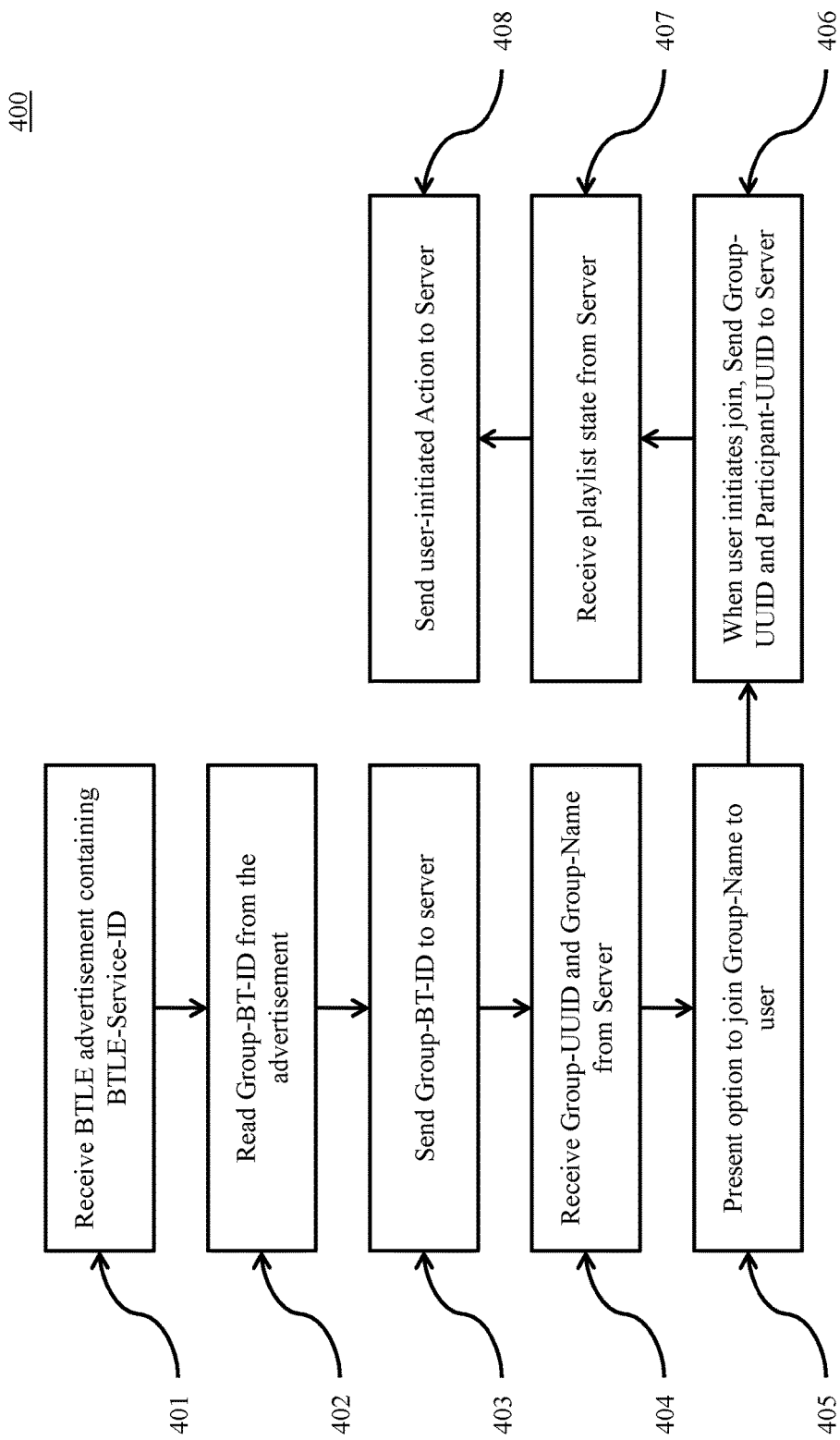
FIG. 4 illustrates a method for proximity-based peer-to-peer collaborative playlists according to embodiments of the present disclosure.

Referring now to FIG. 4, an exemplary method for a participant according to the present disclosure is illustrated. The participant receives 401 an advertisement, for example via Bluetooth low energy, containing BTLE-Service-ID. The participant reads 402 Group-BT-ID from the advertisement. The participant sends 403 Group-BT-ID to the server. The participant receives 404 Group-UUID and Group-Name from the Server. The participant presents 405 an option to join Group-Name to a user via a display device. If the user initiates a join, the participant sends 406 Group-UUID and Participant-UUID to the Server. The participant receives 407 the playlist state from the Server. The participant sends 408 user-initiated Actions to the Server.

It will be apparent that a variety of user interfaces are suitable for use according to the present disclosure. For example, various visual prompts may be displayed on a display of a host device for the user to identify a group name, to invite participants, to control media playback, and to manage the media playlist. Similarly, a variety of visual prompts may be displayed on a display of a participant device for the user to select a group to join, to view a playlist, to control media playback, and to manage the media playlist. It will be appreciated that the host, server, and participants are in various embodiments computing nodes as set forth below.

As noted above, various embodiments according to the present disclosure use Bluetooth low energy for advertisement. However, when mobile devices are playing music, it is common for the operating system to turn off the screen and move the music player application to the background to preserve battery life. When an application is backgrounded, most mobile operating systems restrict the amount of data that can be present in a Bluetooth low energy advertisement. In such cases, all applications on the mobile device need to share a single advertisement. Typically, this restricts the advertisement to contain only a Service ID and basic advertising information (e.g., a Device UUID).

With just this information alone, the configuration discovery described above would not be practicable, as the Group-BT-ID is missing from the advertisement. To address this, some embodiments of the present disclosure include methods to efficiently establish peer-to-peer Bluetooth low energy connections for exchanging metadata. According to some such embodiments, a cache is maintained and cloud infrastructure is leveraged to reduce the amount of direct peer-to-peer BTLE connections required.

Figure 5:
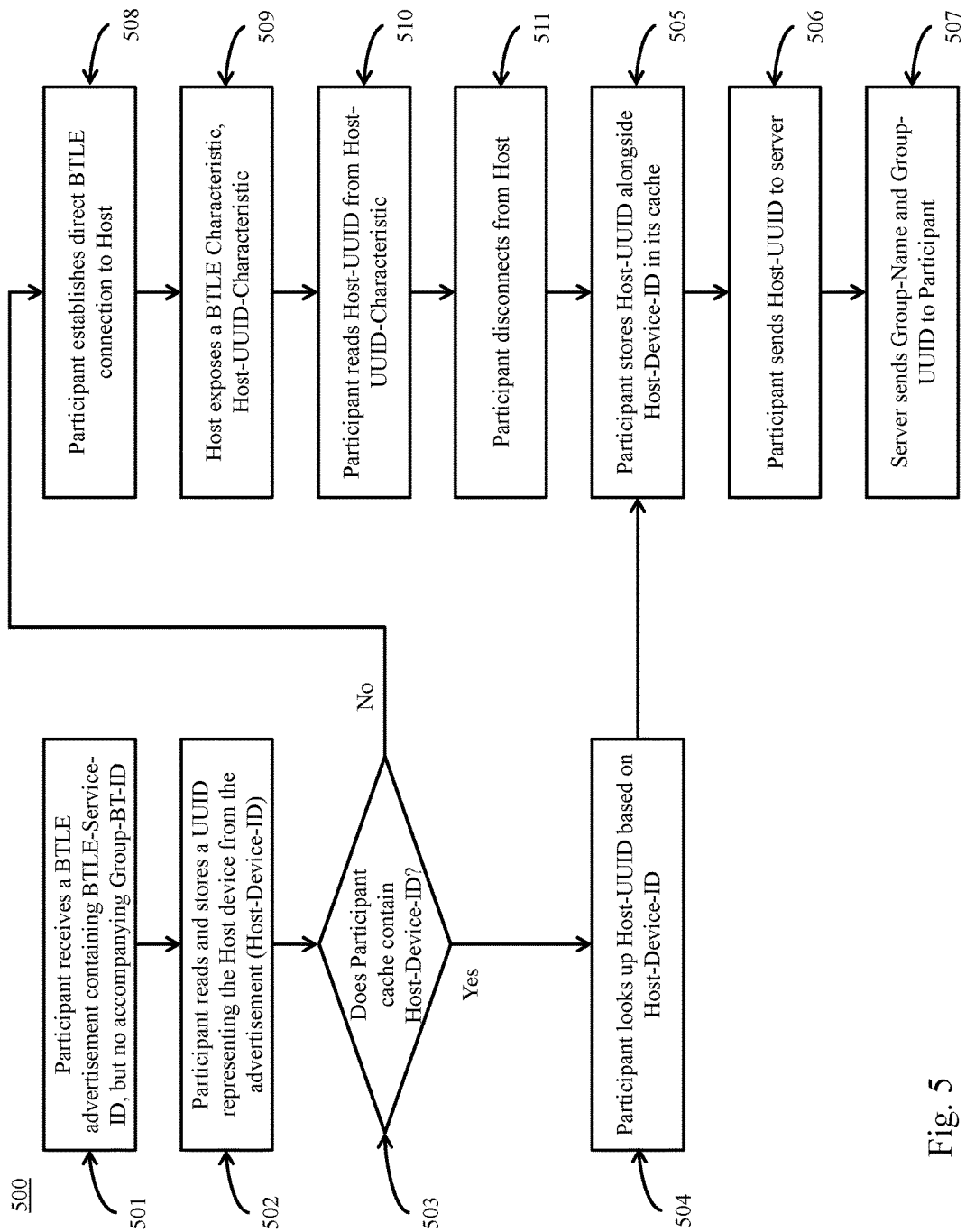
FIG. 5 illustrates a method for the exchange of advertisement metadata in restricted advertising environments according to embodiments of the present disclosure.

Referring now to FIG. 5, a method for exchange of advertisement metadata in restricted advertising environments is illustrated. Although this method is described in terms of a Bluetooth low energy implementation, it will be apparent that it is applicable to other wireless environments in which advertisement contents may be limited. A participant receives 501 a Bluetooth low energy advertisement containing BTLE-Service-ID, but no accompanying Group-BT-ID. The participant reads and stores 502 a UUID representing the Host device from the advertisement (Host-Device-ID). In some embodiments, this ID is generated by the BTLE abstraction layer present on a Participant device and is unique to this Participant-Host pair of devices. The participant checks 503 if its cache contains Host-Device-ID.

If the cache entry is present, the Participant looks up 504 the Host-UUID based on the Host-Device-ID. The Participant stores 505 the Host-UUID alongside the Host-Device-ID in its cache. The Participant sends 506 the Host-UUID to the server. The server sends 507 the Group-Name and Group-UUID to the Participant.

If the cache entry is not present, the Participant establishes 508 a direct BTLE connection to the Host. The Host exposes 509 a BTLE Characteristic, and a Host-UUID-Characteristic. The Participant reads 510 the Host-UUID from the Host-UUID-Characteristic. The Participant disconnects 511 from the Host and continues to store 505 the Host-UUID as described above.

In some embodiments, method 500 is performed in place of steps 401-403 of method 400, as described above.

Figure 6:
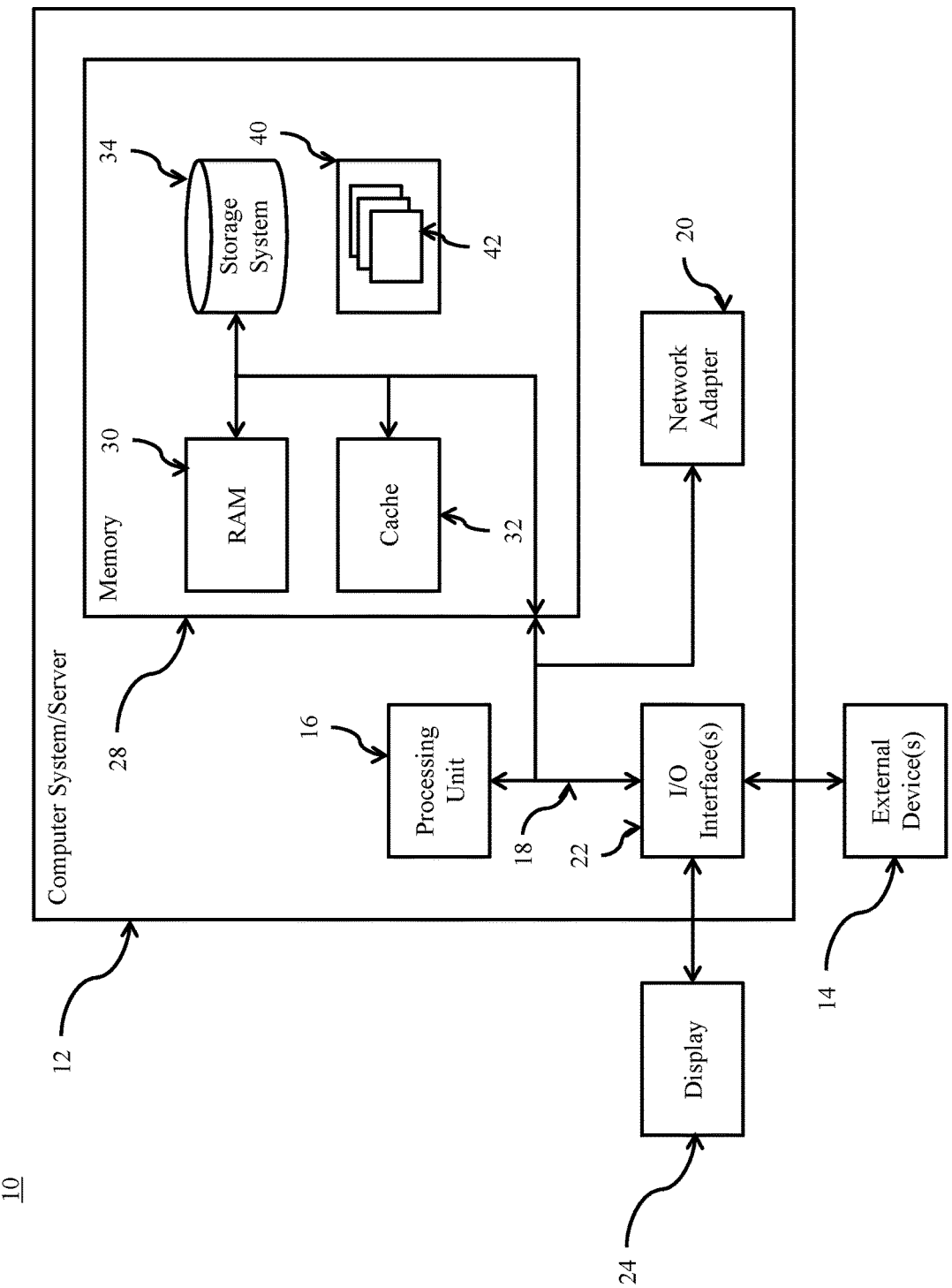
FIG. 6 depicts a computing node according to an embodiment of the present invention.

Referring now to FIG. 6, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    sending, by a host device to a server, a name for a media playlist;
    receiving, by the host device from the server, a media playlist identifier corresponding to the media playlist;
    sending, by the host device, a wireless advertisement for the media playlist,
        the wireless advertisement comprising the media playlist identifier;

establishing, by the host device and based on a cache of a participant device not comprising a host-device-identifier, a connection with the participant device,
the host-device-identifier being associated with the host device and the participant device;
exposing, by the host device and based on establishing the connection, a particular characteristic of the host device;
disconnecting, by the host device and based on exposing the particular characteristic, the connection;
receiving, by the host device and based on disconnecting the connection, at least one media playlist modification request from the participant device,
the at least one media playlist modification request being received via the server; and
modifying, by the host device and based on receiving the at least one media playlist modification request, the media playlist.

2. The method of claim 1, wherein sending the wireless advertisement comprises:
sending the wireless advertisement via a personal area network.

3. The method of claim 2, wherein the personal area network comprises Bluetooth.

4. The method of claim 1, wherein receiving the at least one media playlist modification request comprises:
receiving the at least one media playlist modification request via a wide area network.

5. The method of claim 4, wherein the wide area network comprises the internet.

6. A method, comprising:
receiving, by a mobile device, a wireless advertisement originating from a host device,
the wireless advertisement comprising a media playlist identifier;
determining, by the mobile device, whether a cache comprises a host-device-identifier associated with the host device;
establishing, by the mobile device and based on the cache not comprising the host-device-identifier, a connection with the host device;
reading, by the mobile device and based on establishing the connection, a host identifier;
disconnecting, by the mobile device and based on reading the host identifier, the connection;
storing, by the mobile device, the host identifier in the cache;
sending, by the mobile device to a server, the host identifier;
receiving, by the mobile device and based on sending the host identifier to the server, a name for a media playlist corresponding to the media playlist identifier; and
sending, by the mobile device to the host device via the server, a request to modify the media playlist.

7. The method of claim 6, wherein receiving the wireless advertisement comprises:
receiving the wireless advertisement via a personal area network.

8. The method of claim 7, wherein the personal area network comprises Bluetooth.

9. The method of claim 6, wherein sending the request to modify the media playlist comprises:
sending the request to modify the media playlist via a wide area network.

10. The method of claim 9, wherein the wide area network comprises the internet.

11. A host device, comprising:
a memory; and
one or more processors to:
send, to a server, a name for a media playlist,
receive, from the server, a media playlist identifier corresponding to the media playlist,
send a wireless advertisement for the media playlist,
the wireless advertisement comprising the media playlist identifier, establish, based on a cache of a participant device not comprising a host-device-identifier, a connection with the participant device,
the host-device-identifier being associated with the host device and the participant device,
expose, based on establishing the connection, a particular characteristic of the host device,
disconnect, based on exposing the particular characteristic, the connection,
receive, based on disconnecting the connection, at least one media playlist modification request from the participant device via the server, and
modify, based on receiving the at least one media playlist modification request, the media playlist.

12. The host device of claim 11, wherein the one or more processors, when sending the wireless advertisement, are to:
send the wireless advertisement via Bluetooth.

13. The host device of claim 11, wherein the one or more processors, when receiving the at least one media playlist modification request, are to:
receive the at least one media playlist modification request via the internet.

14. A non-transitory computer-readable medium storing instructions, the instructions comprising:
one or more instructions that, when executed by one or more processors of a host device, cause the one or more processors to:
send, to a server, a name for a media playlist;
receive, from the server, a media playlist identifier corresponding to the media playlist;
send a wireless advertisement for the media playlist,
the wireless advertisement comprising the media playlist identifier;
establish, based on a cache of a participant device not comprising a host-device-identifier, a connection with the participant device,
the host-device-identifier being associated with the host device and the participant device;
expose, based on establishing the connection, a particular characteristic of the host device;
disconnect, based on exposing the particular characteristic, the connection;
receive, based on disconnecting the connection, at least one media playlist modification request from the participant device,
the at least one media playlist modification request being received via the server; and
modify, based on receiving the at least one media playlist modification request, the media playlist.

15. The non-transitory computer-readable medium of claim 14, wherein the one or more instructions, that cause the one or more processors to send the wireless advertisement, cause the one or more processors to:
send the wireless advertisement via a personal area network.

16. The non-transitory computer-readable medium of claim 15, wherein the personal area network comprises Bluetooth.

17. The non-transitory computer-readable medium of claim 14, wherein the one or more instructions, that cause the one or more processors to receive the at least one media playlist modification request, cause the one or more processors to:

receive the at least one media playlist modification request via a wide area network.

18. The transitory computer-readable medium of claim 17, wherein the wide area network comprises the internet.

19. A non-transitory computer-readable medium storing instructions, the instructions comprising:

one or more instructions that, when executed by one or more processors of a mobile device, cause the one or more processors to:

receive a wireless advertisement originating from a host device, the wireless advertisement comprising a media playlist identifier;

determine whether a cache comprises a host-device-identifier associated with the host device;

establish, based on the cache not comprising the host-device-identifier, a connection with the host device;

read, based on establishing the connection, a host identifier;

disconnect, based on reading the host identifier, the connection;

store the host identifier in the cache;

send, to a server, the host identifier;

receive, based on sending the host identifier to the server, a name for a media playlist corresponding to the media playlist identifier; and send, to the host device via the server, at least one media playlist modification request.

20. The non-transitory computer-readable medium of claim 19, wherein the one or more instructions, that cause the one or more processors to receive the wireless advertisement, cause the one or more processors to:

receive the wireless advertisement via a personal area network.

21. The non-transitory computer-readable medium of claim 20, wherein the personal area network comprises Bluetooth.

22. The non-transitory computer-readable medium computer program product of claim 19, wherein the one or more instructions, that cause the one or more processors to send the at least one media playlist modification request, cause the one or more processors to:

send the at least one media playlist modification request via a wide area network.

23. The non-transitory computer-readable medium of claim 22, wherein the wide area network comprises the internet.

* * * * *

UNITED STATES PATENT AND TRADEMARK OFFICE
CERTIFICATE OF CORRECTION

| | |
|---|---|
| PATENT NO. | : 10,348,818 B1 |
| APPLICATION NO. | : 15/416802 |
| DATED | : July 9, 2019 |
| INVENTOR(S) | : Matt Bridges et al. |

It is certified that error appears in the above-identified patent and that said Letters Patent is hereby corrected as shown below:

In the Claims

In Claim 22, Column 12, Lines 16-17, "The non-transitory computer-readable medium computer program product of claim 19," should be changed to -- The non-transitory computer-readable medium of claim 19, --.

Signed and Sealed this
Sixteenth Day of June, 2020

Andrei Iancu
*Director of the United States Patent and Trademark Office*